8581X
A. J. Murray,
Cotton Press.
Patented Jan. 9, 1835.
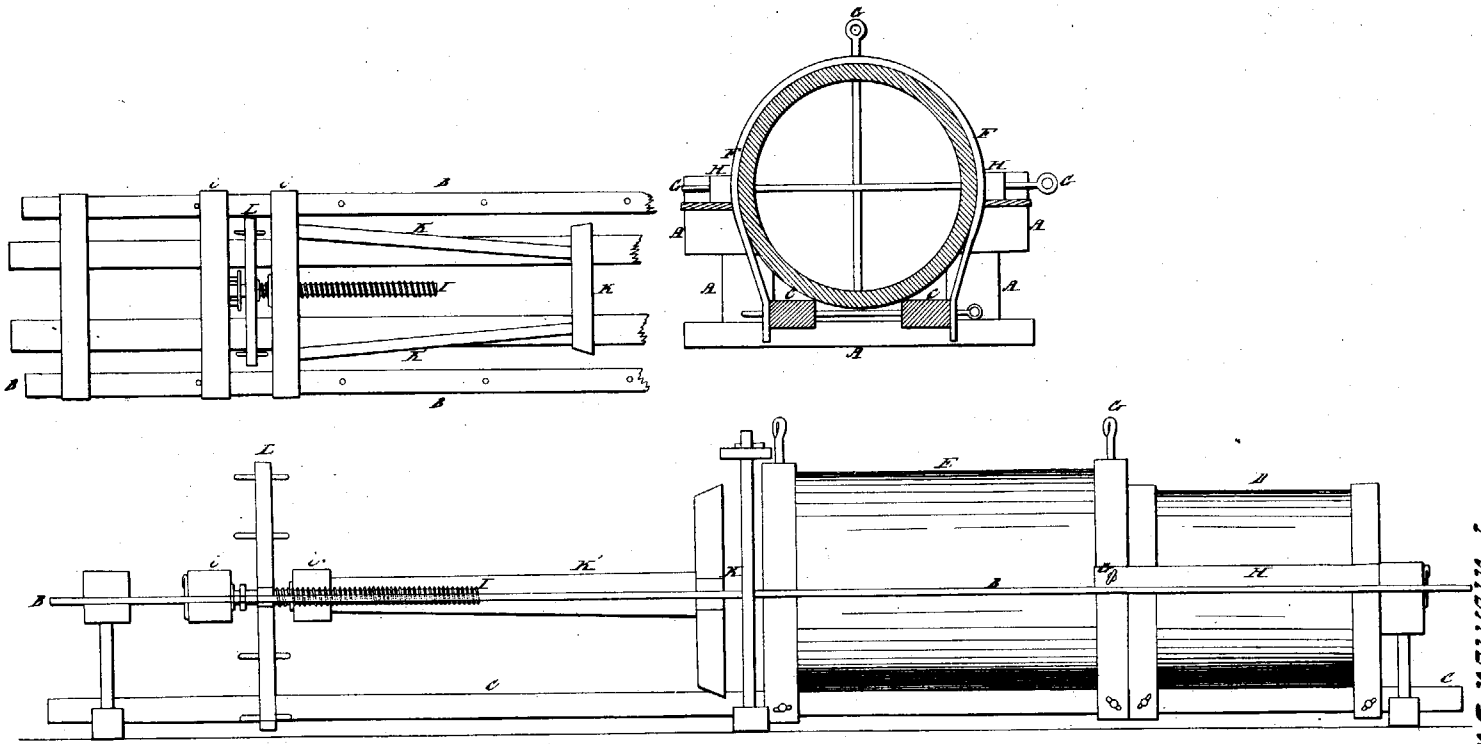
AM. PHOTO-LITHO. CO. N.Y. (OSBORNE'S PROCESS.)

\# Alexander I Murray . Annapolis. Maryland

Letters Patent.

The Schedule Referred to in these letters Patent and making part of the same containing a description in the words of the said Alexan der I Murray himself of his improvement in the Portable press for pressing Tobacco Cotton Hay &c To all to whom these presents shall come - Be it known that I Alexander I Murray of Annapolis in the County Of Ann Arun del and State of Maryland have invented a new and useful improve ment in the "Portable press" for pressing Tobacco Cotton Hay &c and that the following is a full and exact description thereof An oblong frame is to be constructed of any suitable timber the length may be about twenty feet and the height and width propor tioned to the diameter of the Wheel intended to be used which may be about eight or ten feet. The two ends of this frame are to be connected together by the side pieces. one or more on each side and let into the upper part of each end These side pieces are to be of thinner stuff than that of the ends in to which they are tenanted and are to be furnished with a hole or perforation for the reception of an iron pin at each end and with a number of others extending at intervals to about half the length of said pieces. At the opposite ends where these perforations are discontinued & beneath the side pieces a support or cradle is laid of sufficient length to contain a hogshead or other receiver for the ma terial that is to be pressed and also another cylinder or false hogs- head when the material is Tobacco and which may be of sufficient length to contain enough in bulk to fill the Hogshead at one press ing. It is to be of about the same size as the hogshead that the tobacco may pass from one to the other easily & is secured in its situation on the cradle by means of bands or hoops passing over it and fastened down to the cradle in such as manner as to be easily \# Re-issued May 17. 1842

[illegible]

8381X endone to refill the false hogshead when necessary. This hogshead may be set on its end and hand packed when two pins will be necessary to pass through at one end across each other to retain the packing - and one at the other lest the contents might be scattered in placing it on its side which will be the situation when filled ready to be pressed The hogshead in which the tobacco is to be pressed is placed behind the false one and just entering its extremity to be secured by bands in the same manner to the cradle and with the end which has the head in placed against the end of the frame. the other end which has had the head removed is joined on to the false hogshead both placed upon their sides. An iron band extends along each side of the hogshead from the end of the frame where it is secured to the top of said hogshead beyond which it projects sufficiently far to admit of an eye or hole through it intended to admit a long rod or pin & the rod is to pass through the cylinder also for which reason there is a small slit or groove left for that purpose immediately joining the eye of the band. Between the cylinder and the opposite end of the frame containing that portion of the horizontal side pieces which is perforated is placed the screw apparatus. The Screw is to be laid also in a horizontal position and is to be secured in its position between two or more cross pieces which where two only are used will be of about the same length across as the end pieces & have a mortice in each end for the reception of the horizontal side pieces upon which they will thus traverse or slide backward or forward. That piece next the false hogshead is to have two pieces of timber projecting in front of the female screw which is to be secured in this cross piece and they are to be one on each side of it of sufficient length to clear the whole length of the cylinder or false hogshead when driven forward through it. They are to be united at the ends intended to enter by a circular piece formed to fit the cylinder & which is to have a groove cut across its front face for the rod to pass through which is to secure the head in the hogshead when driven home. At a proper distance behind this cross piece is to be placed the other against which the screw is to press in driving forward where only two are used. It has a box or heel plate secured to it for the reception of the heel of the screw and on which it turns. Strong braces of iron extend from this end piece to the back of the wheel where they securely hold a collar formed round the butt of the screw shaft and in which it revolves. Adjoining this collar and in front of it is secured the wheel for working said screw, and may be of about 8 or ten feet in diameter, it has pins projecting from the back & may be thus worked by hand.

The shaft of the screw is left square for this purpose of receiving the wheel. & the thread may extend to it. In pressing Tobacco it is not always advisable to continue the pressure but for Cotton Hay or other substances. I continue the pressure at every revolution of the screw always driving on even when regaining the length of my screw for a fresh purchase. In order to do this I shall require another cross piece and another additional horizontal piece at each side by which arrangement I still can advance the lever while I regain my screw — The hogshead is to have four or more holes formed in the side for the reception of strong pins and in different planes or sections of said hogshead so as to retain the portion of tobacco pressed at each operation, if more than one are desired by means of pins driven into these holes upon the contents. This is the construction of my machine — the operation is as follows.

The false hogshead or cylinder when tobacco is to be packed is taken from the cradle and set on end, the two cross pins down the interior is now hand packed with as much as desired and the top pin put in again. It is now placed horizontally on the cradle in front of the empty hogshead with its corresponding head out. the two are joined together and clamped down. the head of the hogshead is now put into the mouth of the cylinder in front of the follower and the pins removed. The screw is turned and the head driven forward till it has passed thro the pressure already gained while I regain the length of the screw
by reversing the motion either in a continued motion or where
it is to be by intervals as obtained by the use of either two or more cross
and side pieces Also for the use of the pins in retaining the
portions as they are packed both in the cylinder or false hogs
head + in the hogshead.

In testimony that the above is a full and exact des-
cription of the construction and operation of my machine as
invented by me I have hereunto set my hand this twen
ty fourth day of December Eighteen Hundred and thirty four Witnesses
Henry Stone
Robt Clarke Alexr. J. Murray. Ex[illegible]
Ch.[illegible]

1807 [illegible]